(12) United States Patent
Ting

(10) Patent No.: US 8,796,564 B2
(45) Date of Patent: Aug. 5, 2014

(54) PRODUCE TRANSACTION SYSTEM AND METHOD INCLUDING A SCALE AND A COMPUTER SEPARATE FROM A CHECKOUT COMPUTER

(75) Inventor: Orson Ting, Cebu (PH)

(73) Assignee: NCR Corporation, Duluth, GA (US)

( * ) Notice: Subject to any disclaimer, the term of this patent is extended or adjusted under 35 U.S.C. 154(b) by 425 days.

(21) Appl. No.: 12/815,602

(22) Filed: Jun. 15, 2010

(65) Prior Publication Data

US 2011/0303468 A1    Dec. 15, 2011

(51) Int. Cl.
    *G01G 19/415*      (2006.01)
    *G06Q 20/00*      (2012.01)

(52) U.S. Cl.
    USPC ............ 177/25.13; 177/25.15; 235/383; 705/416

(58) Field of Classification Search
    USPC ................ 177/25.13, 25.15; 235/383; 705/414–416
    See application file for complete search history.

(56) References Cited

U.S. PATENT DOCUMENTS

| | | | | |
|---|---|---|---|---|
| 5,967,264 | A * | 10/1999 | Lutz et al. | 186/61 |
| 7,214,891 | B1 * | 5/2007 | Hewitt et al. | 177/25.15 |
| RE41,093 | E * | 2/2010 | Lutz et al. | 186/61 |
| 7,837,103 | B2 * | 11/2010 | Suto | 235/383 |
| 8,278,570 | B2 * | 10/2012 | Sun | 177/25.13 |
| 2006/0231109 | A1 * | 10/2006 | Howell et al. | 128/898 |
| 2006/0238346 | A1 * | 10/2006 | Teller | 340/572.1 |
| 2007/0210154 | A1 * | 9/2007 | Suto | 235/383 |
| 2007/0255665 | A1 * | 11/2007 | Oosugi et al. | 705/414 |

FOREIGN PATENT DOCUMENTS

| | | | | |
|---|---|---|---|---|
| JP | 2007-94655 | * | 4/2007 | G06Q 50/00 |
| JP | 2007-249910 | * | 9/2007 | G06Q 50/00 |

* cited by examiner

*Primary Examiner* — Randy W Gibson
(74) *Attorney, Agent, or Firm* — Paul W. Martin

(57) ABSTRACT

A produce transaction system and method which is located in a produce section of a store. The produce transaction system includes a scale below a container in a produce section of a store, the container storing a single type of produce item, and a computer coupled to the scale for receiving a weight decrease signal from the scale when a customer removes an amount of the single type of produce item from the scale and for storing produce purchase information associated with the single type of produce item for later retrieval by a checkout computer.

16 Claims, 3 Drawing Sheets

PRODUCE TRANSACTION SYSTEM AND METHOD INCLUDING A SCALE AND A COMPUTER SEPARATE FROM A CHECKOUT COMPUTER

BACKGROUND

To purchase produce items, customers typically place produce items in bags. Customers may additionally weigh the produce items at scales near shelves containing the produce items. At checkout, a cashier weighs the produce items and determines price.

It would be desirable to provide an alternative method of purchasing produce which speeds up transaction times.

SUMMARY

A produce transaction system and method is provided.

The produce transaction system includes a scale below a container in a produce section of a store, the container storing a single type of produce item, and a computer coupled to the scale for receiving a weight decrease signal from the scale when a customer removes an amount of the single type of produce item from the scale and for storing produce purchase information associated with the single type of produce item for later retrieval by a checkout computer.

A produce transaction method includes receiving a weight decrease signal from a scale in a produce section of a store when a customer removes an amount of a single type of produce item from the scale by a computer in the produce section, the scale supporting a container of the single type of produce item, and storing produce purchase information associated with the single type of produce item for later retrieval by a checkout computer.

DETAILED DESCRIPTION

Figure 1:
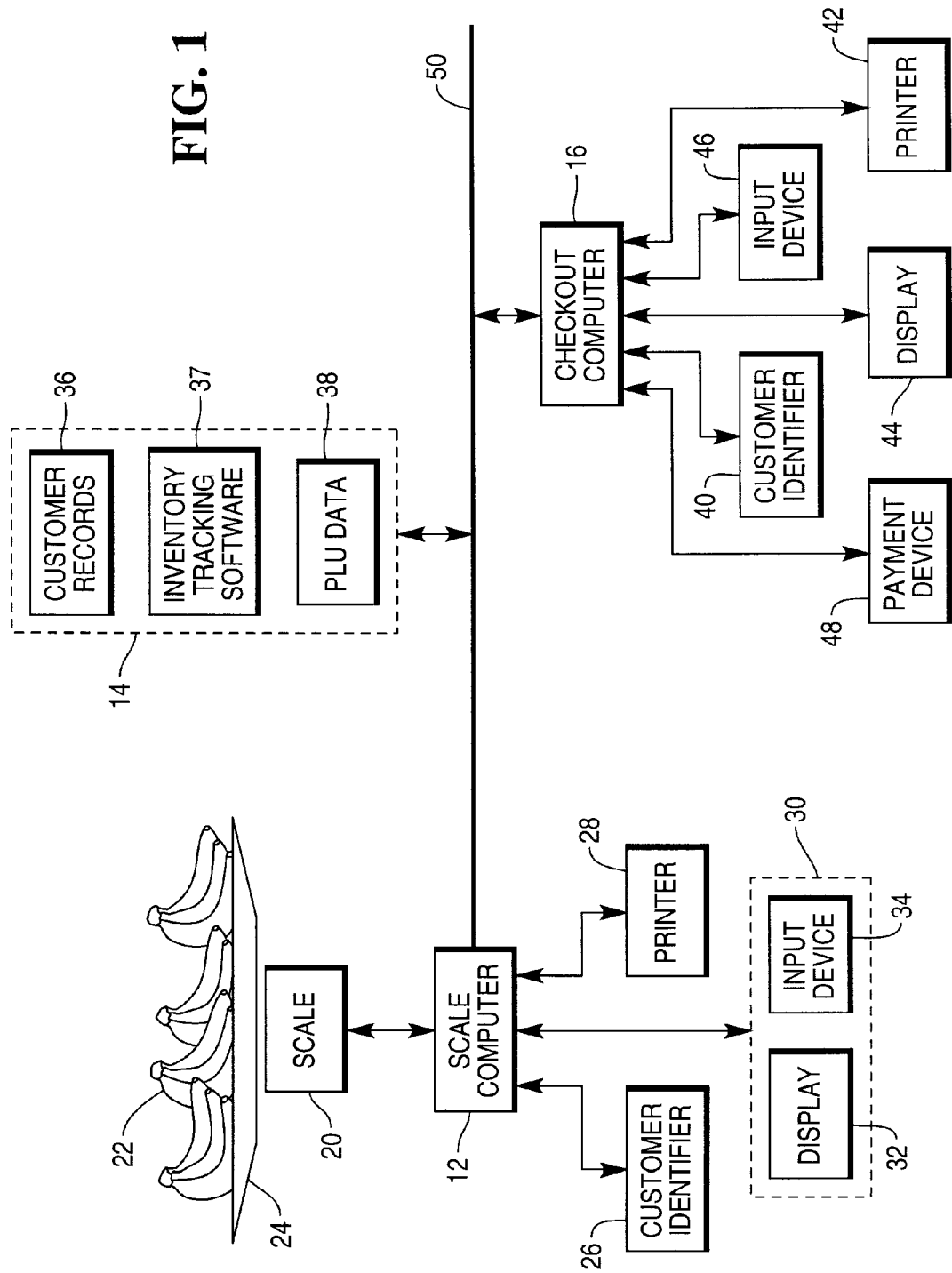
FIG. 1 is a block diagram of an example produce transaction system.

Referring now to FIG. 1, an example self-service system includes scale computer 12, server 14, and checkout computer 16. Scale computer 12, server 14, and checkout computer 16 may be coupled via a network 50.

Scale computer 12 may include a processor, memory, and may execute an operating system such as a Microsoft operating system. Scale computer 12 may be operated by an employee in an assisted mode, or by a customer in a self-service mode. Scale computer 12 may be located in a store adjacent scale 20 and produce items 22.

Scale computer 12 obtains weight information from a single produce scale 20 which weighs a single type of produce item 22 that is uniquely priced.

In another example, scale computer 12 connects to a plurality of scales 20, with each scale 20 weighing a single type of produce item 22 that is uniquely priced.

Each scale 20 is dedicated to weighing a single type of produce item 22 that is uniquely priced. For example, scale 20 may weigh Cavendish bananas. Another scale 20 may weigh Plantains if differently priced. Yet another scale may weigh red bananas if differently priced.

Each type of produce item 22 may be located in a basket or other container 24 or on a shelf, which is in turn located above a corresponding scale 20. Each scale computer 12 records current weight of both produce items 22 and container 24.

As produce items 22 are removed by customers during shopping, scale computer 12 records decreases in weight. One or more scale computers 12 may store weight decreases in one or more records associated with a customer.

Scale computer 12 may include security monitoring features, or be coupled to or be assisted by a separate security system which identifies improper customer substitutions and other security violations. For example, scale computer 12 may monitor for weight additions before weight decreases. This may indicate that a customer has applied an inexpensive and different produce item or a non-produce item to container 24 with the intent to remove a produce at no cost. As another example computer 12 may compare weight removed from container 24 to weight added back to container 24 during a transaction. If a customer removes a produce item and returns an inexpensive and different produce item or a non-produce item of substantially different weight to container 24, computer 12 will display a warning message.

Other security devices and features are also envisioned. For example, scale computer 12 may receive security information from a camera mounted over container 24.

Scale computer 12 may obtain prices associated with produce items 22 from price look-up (PLU) data 38 at server 14.

Scale computer 12 may store the decreases in weight and/or the corresponding prices in customer records 36 at server 14 for later recall by checkout computer 16 during customer checkout.

Scale computer 12 may print a record of the weight decrease and price using optional printer 28.

Scale computer 12 may create a customer record 36 based upon loyalty or other information provided by a customer. For example, scale computer 12 may be coupled to a customer identifier 26.

An example customer identifier 26 may include one or more of any technology suitable for identifying a customer. For example, customer identifier 26 may include a barcode reader for reading barcodes carried by customers, for example, on loyalty cards. Customer identifier 26 may include a magnetic stripe reader for reading magnetic stripes on loyalty cards equipped with magnetic stripes. Customer identifier 26 may include a wireless or near field communication reader for wireless reading identification chips carried by customers, for example, as part of loyalty cards. Finally, customer identifier 26 may include a biometric reader.

Scale computer 12 may alternately assign an arbitrary identifier to a customer, such as a barcode or an alphanumeric identifier, and create a corresponding temporary record 36 at server 14. Scale computer 12 may print the identifier with the weight decrease and price using optional printer 28. Following checkout, checkout computer 16 may erase the temporary record 36.

Scale computer 12 may also display a weight decrease associated with removal of produce items 22 using optional display 32. For example, display 32 may display the name associated with the type of produce item 22, a purchase weight of produce items 22 equal to a weight decrease recorded from scale 20, and a price for produce items 22 based upon the purchase weight.

Scale computer 12 may include optional input device 34 allowing a customer to confirm weights and prices, or remove or add some of produce item 22 before confirming selection. Following receipt of customer confirmation, scale computer 12 sends weight information to customer record 36.

Display 32 and input device 34 may be combined as a touch screen 30.

Server 14 stores customer records 36 and PLU data 38. Server may additionally execute inventory tracking software 37 for monitoring weight decreases in individual produce items 22 from scale computers 14, generating inventory reports, issuing alerts when inventories of individual produce items 22 fall below predetermined thresholds, and initiating ordering of additional inventory.

Server 14 may include a processor, memory, and may execute an operating system such as a Microsoft operating system.

Checkout computer 16 obtains weight information from customer records 36, determines a price based upon the weight information, and records payment. Advantageously, there is no need to weigh produce items 22, other than for auditing customer honesty.

Checkout computer 16 may include a processor, memory, and may execute an operating system such as a Microsoft operating system. Checkout computer 16 may be operated by an employee in an assisted mode, or by a customer in a self-service mode.

To begin checkout, the customer may provide identification information through customer identifier 40. Customer identifier 40 may be similar to customer identifier 26. For example, customer identifier 40 may include a card reader for reading customer loyalty cards.

If a customer is not a loyalty program member, the customer may be assigned a temporary identifier by scale computer 12. For example, the temporary identifier may include a barcode printed by printer 28 and customer identifier 40 may include a barcode reader.

As another example, the temporary identifier may include a number. The customer enters the number via input device 46.

Checkout computer 16 adds items selected for purchase by the customer to the transaction, including produce and non-produce items, and tallies the prices. Checkout computer 16 may be coupled to one or more peripherals for identifying non-produce items. For example, checkout computer 16 may be coupled to either or both a barcode reader and a radio frequency identification (RFID) tag reader for reading product identifiers on non-produce items. Checkout computer 16 obtains price information from PLU data 38.

Checkout computer 16 may additionally display a running tally of purchased items on display 44.

Following tallying of all items, checkout computer 16 records payment via payment device 48. Payment device 48 may include one or more of a card reader, a cash money acceptor, and a cash money dispenser. Cash money may include one or both of coins and currency. The functions of customer identifier 40 and payment device 48 may be combined, for example, to the extent both envision reading of cards. Finally, checkout computer 16 prints a receipt via printer 42.

Figure 2A:
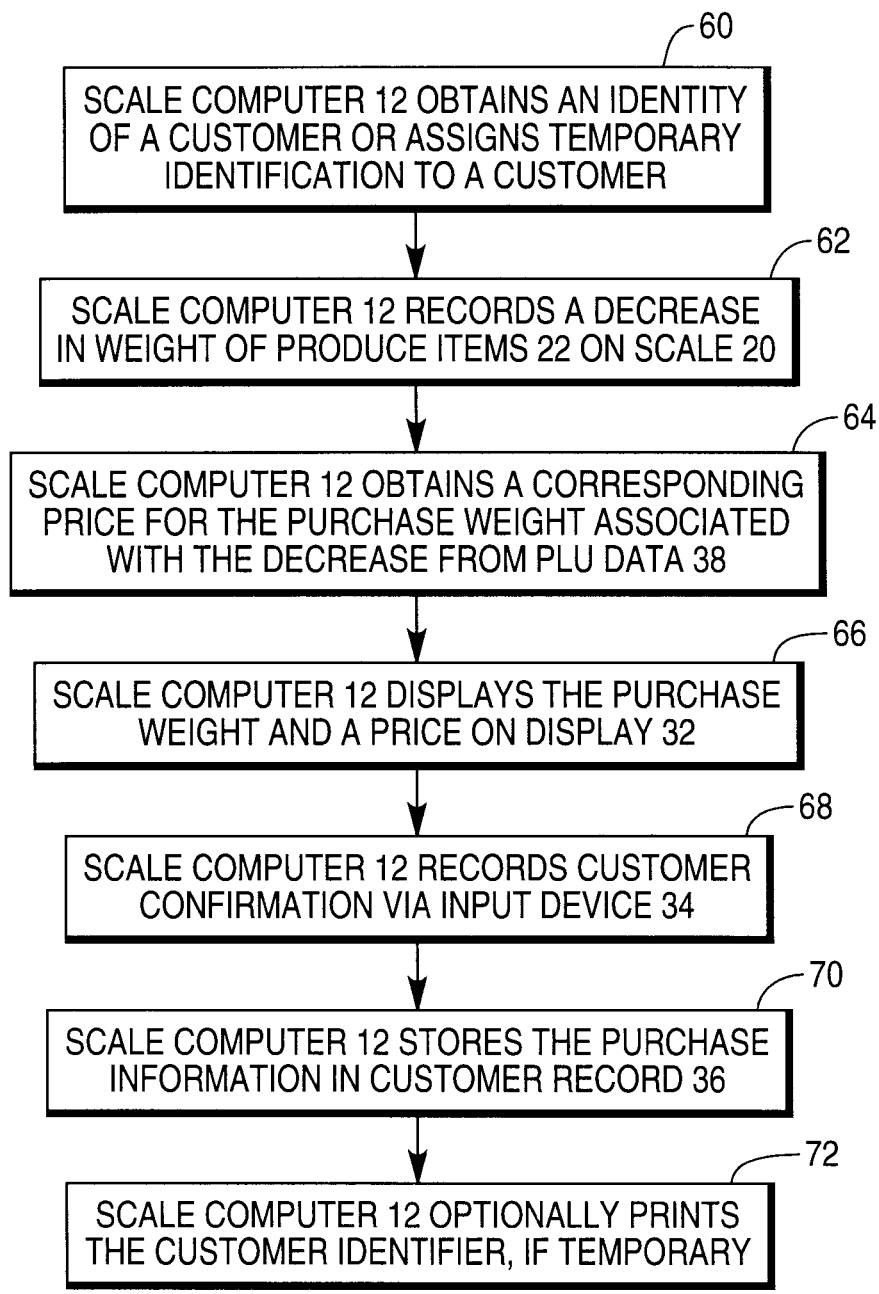
FIGS. 2a and 2b form a flow diagram illustrating an example produce transaction method.

With reference to FIG. 2a, a first portion of an example produce transaction method in which produce items 22 are selected is illustrated.

In step 60, scale computer 12 obtains an identity of a customer or assigns temporary identification to a customer.

In step 62, scale computer 12 records a decrease in weight of produce items 22 on scale 20.

In step 64, scale computer 12 obtains a corresponding price for the purchase weight associated with the decrease from PLU data 38.

In step 66, scale computer 12 displays the purchase weight and a price on display 32.

Scale computer 12 records any further decreases or increases in the weight of produce items 22 on scale 20 and displays updated purchase weight and price information on display 32.

In step 68, scale computer 12 records customer confirmation via input device 34.

In step 70, scale computer 12 stores the purchase information in customer record 36. The purchase information may include purchase weight and/or price information.

In step 72, scale computer 12 optionally prints the customer identifier, if temporary.

Figure 2B:
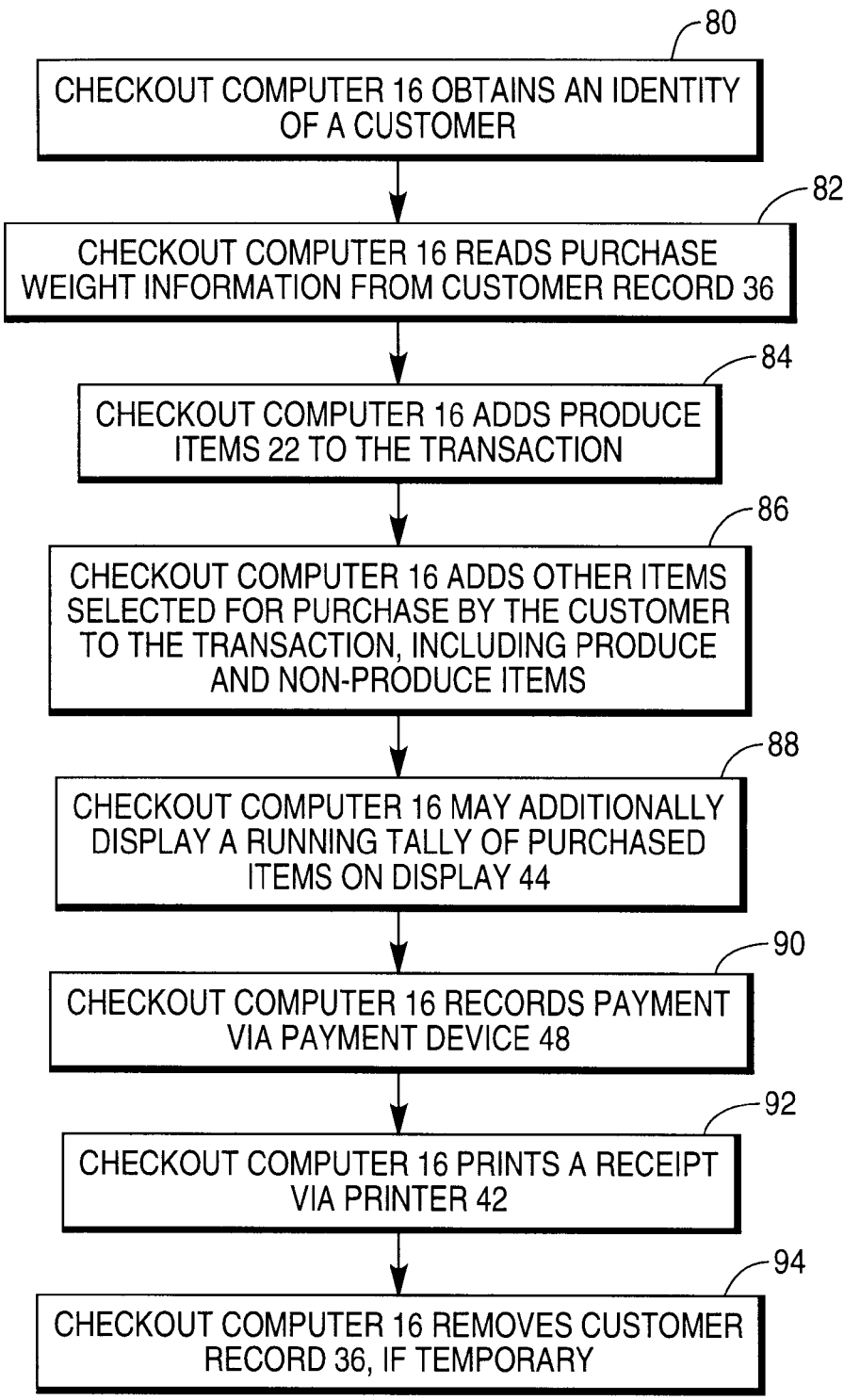

With reference to FIG. 2b, a second portion of the example produce transaction method in which checkout occurs is illustrated.

In step 80, checkout computer 16 obtains an identity of a customer.

In step 82, checkout computer 16 reads purchase information from customer record 36.

In step 84, checkout computer 16 adds produce items 22 to the transaction.

In step 86, checkout computer 16 adds other items selected for purchase by the customer to the transaction, including produce and non-produce items.

In step 88, checkout computer 16 may additionally display a running tally of purchased items on display 44.

In step 90, checkout computer 16 records payment via payment device 48.

In step 92, checkout computer 16 prints a receipt via printer 42.

In step 94, checkout computer 16 removes customer record 36, if temporary.

Although particular reference has been made to certain embodiments, variations and modifications are also envisioned within the spirit and scope of the following claims.

What is claimed is:

1. A produce transaction system comprising:
    a scale below a container in a produce section of a store, the container storing a single type of produce item;
    a card reader; and
    a scale computer separate from a checkout computer and coupled to the scale for obtaining a customer identifier from a card of the customer via the card reader, for receiving a weight decrease signal from the scale when a customer removes an amount of the single type of produce item from the scale and for storing produce purchase information associated with the single type of produce item in a customer record associated with the customer identifier at a server accessible to the checkout computer.

2. The system of claim 1, further comprising a display for displaying the amount, wherein the produce purchase information includes the amount.

3. The system of claim 1, wherein the scale computer is also for determining a price of the amount, and wherein the produce purchase information includes the price.

4. The system of claim 2, wherein the scale computer is also for determining a price of the amount, and wherein the display is also for displaying the price.

5. The system of claim 4, further comprising an input device, wherein the scale computer is also for obtaining customer approval before storing the produce purchase information.

6. The system of claim 5, further comprising a printer for printing the produce purchase information.

7. The system of claim 1, further comprising:
another container in the produce section of the store, the other container storing another single type of produce item different than the one single type of produce item; and
another scale below the other container.

8. The system of claim 7, wherein the scale computer is also for receiving another weight decrease signal from the other scale when the customer removes another amount of the other single type of produce item from the other scale and for storing other produce purchase information associated with the other single type of produce item in the customer record associated with the customer identifier for later retrieval by the checkout computer.

9. The system of claim 7, further comprising:
another scale computer coupled to the other scale for receiving another weight decrease signal from the other scale when the customer removes another amount of the other single type of produce item from the other scale and for storing other produce purchase information associated with the other single type of produce item in the customer record associated with the customer identifier for later retrieval by the checkout computer.

10. A produce transaction method comprising:
receiving a weight decrease signal from a scale in a produce section of a store when a customer removes an amount of a single type of produce item from the scale by a scale computer in the produce section and separate from a checkout computer, the scale supporting a container of the single type of produce item;
obtaining the customer identifier from a card of the customer; and
storing produce purchase information associated with the single type of produce item in a customer record associated with a customer identifier at a server accessible to the checkout computer.

11. The method of claim 10, further comprising:
determining a price associated with the amount; and
displaying the amount and the price on a display by the computer;
wherein the produce purchase information includes at least one of the amount and the price.

12. The method of claim 11, further comprising:
obtaining customer approval before storing the produce purchase information by the computer.

13. A produce transaction system comprising:
a scale below a container in a produce section of a store, the container storing a single type of produce item;
an input device;
a printer;
a display; and
a computer for receiving a weight decrease signal from the scale when a customer removes an amount of the single type of produce item from the scale, for determining a price of the amount, for displaying the amount and the price, for obtaining customer approval, for printing a barcode containing identifying information, and for storing produce purchase information including the amount and the price associated with the single type of produce item in a record associated with the identifying information for later retrieval by a checkout computer;
wherein the barcode is readable by a barcode reader coupled to the checkout computer.

14. A produce transaction method comprising:
receiving a weight decrease signal from a scale in a produce section of a store when a customer removes an amount of a single type of produce item from the scale by a computer in the produce section, the scale supporting a container of the single type of produce item;
creating a temporary identity for the customer;
printing the temporary identity; and
storing produce purchase information including the amount associated with the single type of produce item in a record associated with the temporary identity for later retrieval by a checkout computer.

15. The method of claim 14, wherein the printing step comprises:
printing a barcode containing the temporary identity.

16. A produce transaction method comprising:
receiving a weight decrease signal from a scale in a produce section of a store when a customer removes an amount of a type of produce item from the scale by a computer in the produce section, the scale supporting a container of the type of produce item;
creating a barcode containing a customer identifier;
providing the barcode to the customer; and
storing produce purchase information including the amount associated with the type of produce item in a record associated with the customer identifier for later retrieval by a checkout computer.

* * * * *